Feb. 8, 1944.     G. A. TINNERMAN     2,341,063
TOOL
Filed April 15, 1941
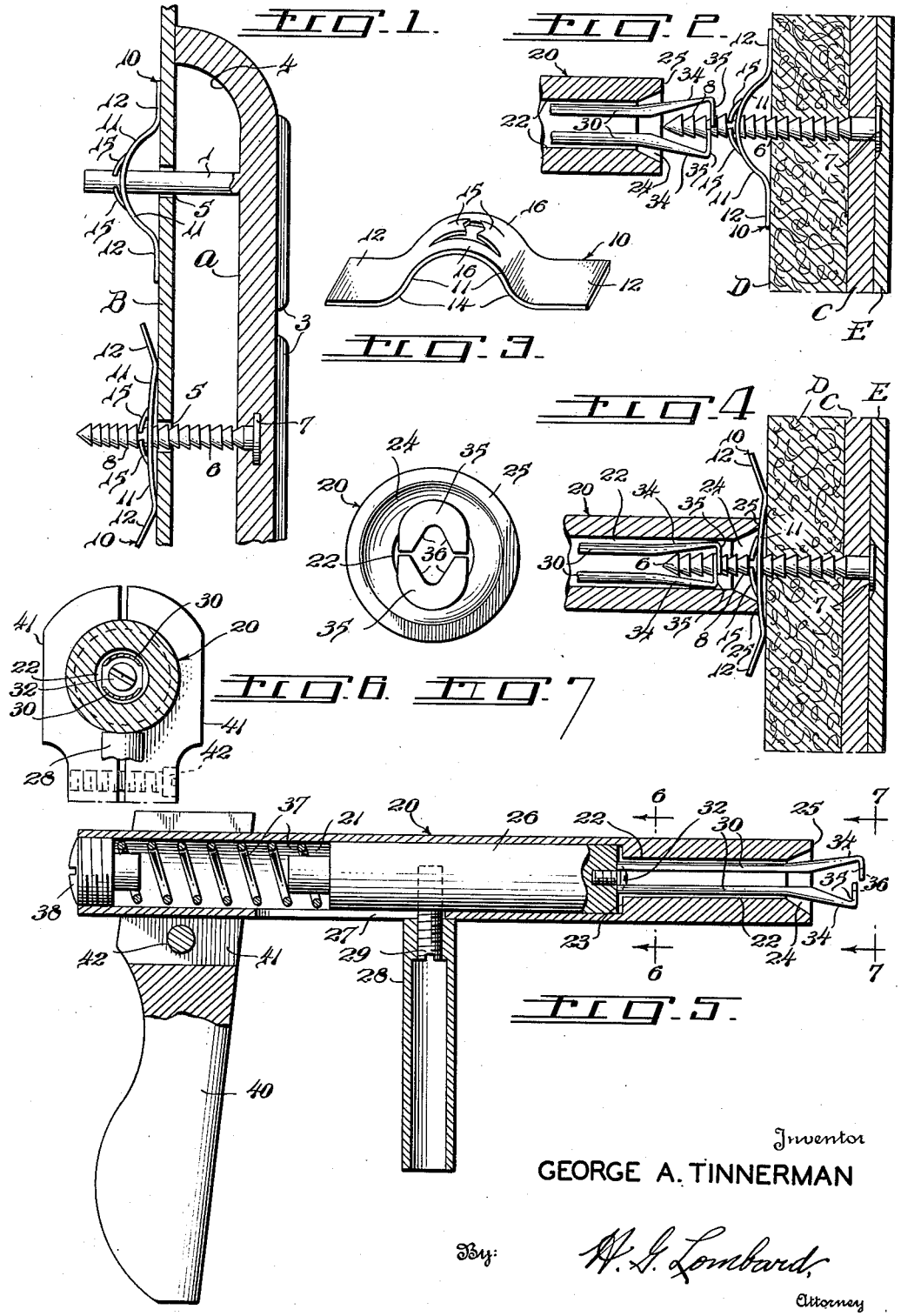
Inventor
GEORGE A. TINNERMAN Patented Feb. 8, 1944

2,341,063

UNITED STATES PATENT OFFICE 2,341,063

TOOL

George A. Tinnerman, Cleveland, Ohio, assignor to Tinnerman Products, Inc., Cleveland, Ohio, a corporation of Ohio Application April 15, 1941, Serial No. 388,706

3 Claims. (Cl. 81—3)

This invention relates in general to fastening installations embodying an improved form of spring nut device or the like, together with a tool for applying such spring nut devices to tightened, tensioned fastening position in a minimum of time and effort.

The improved spring nut devices of the present invention and the tool therefor are adapted for a wide range and variety of uses but are particularly advantageous in what are known as blind locations wherein both sides of the parts secured are not conveniently or readily accessible and the final fastening of the parts is more advantageously or necessarily performed by an operation taking place entirely from the accessible side of the installation.

In the securing of relatively fragile parts such as glass, plastics, etc., there must be employed a spring nut or locking plate which is considerably more flexible than heretofore known forms of such devices in order to avoid mutilation, cracking or breakage of such relatively fragile parts. In this relation, the tool of the present invention is particularly advantageous in applying and tensioning a spring nut entirely from the rearward side of an assembly without requiring the associated connecting stud to be supported at the forward side of such parts, as is necessary in the application of a spring nut by a thrust-type tool, for example, in which there is considerable danger of mutilation, cracking or breakage of said relatively fragile parts in this respect also.

With objects apparent from the foregoing in view, further objects and advantages, and other new and useful features in the construction, arrangement and general combination of parts of the invention will be readily apparent to those skilled in the art as the following description proceeds with reference to the accompanying drawing, for purposes of illustration but not of limitation, in which like reference characters designate like parts throughout the same, and in which:

Fig. 1 is a sectional view of an assembly of parts secured by fastening means in accordance with the invention;

Fig. 2 is a sectional view of another type of assembly illustrating a fastener in temporary fastening position together with a fragmentary showing of the tool about to be applied thereto to tension the same in final fastening position;

Fig. 3 is a perspective view of the fastener per se shown in Figs. 1 and 2;

Fig. 4 is a view similar to Fig. 2 showing the tool as actuated to tension the fastener in finally applied fastening position;

Fig. 5 is a vertical sectional view of a preferred form of tool provided in a general, pistol-type construction;

Fig. 6 is a sectional view of Fig. 5 taken along line 6—6, looking in the direction of the arrows; and, Fig. 7 is a front elevational view, on an enlarged scale, of the forward end of the tool, as along line 7—7 of Fig. 5, looking in the direction of the arrows.

Referring now, more particularly, to the drawing, Fig. 1 represents in general any type of installation in which cooperating parts are secured by the spring nut fastening devices of the invention which may be applied to connecting means in any of the forms of an integral stud, barbed shank, rivet, nail or threaded fastener, or the like. In the present illustration, for example only, the part A may be a plastic part provided with one or more integrally molded plain studs 1 and/or barbed shanks 6 having heads 7 embedded therein in the molding operation in the manner of metallic inserts. Said connecting means all project in the same general direction from the undersurface of said part while the outer surface of said part may include raised portions 3 in the manner of lettering or ornamental and artistic designs and the like, together with a peripheral flange portion 4 maintaining said part in spaced relation to the supporting panel or other part B.

The said connecting means comprising spaced studs 1, 6, are received in correspondingly spaced apertures 5 in the supporting part B to project from the rearward side thereof in position for application of resilient spring nut fastening devices 10 over the free ends thereof. Since the supporting part B may be of relatively fragile material also, such as glass or plastic composition, the spring nut devices are of a highly resilient and flexible construction to avoid any such damaging stresses or strains on said part as would cause a fracture or breaking thereof. Also, inasmuch as the body of part A is disposed in spaced relation to said supporting part B by flange 4 and includes the raised design portions 3, the same cannot be safely supported on the outer face thereof in backing up the connecting studs 1, 6, during the application of the spring nut devices thereto as required in the use of a thrust-type tool, for example, since this would result in mutilation of said raised design portions 3 and possible cracking or breaking of said part A. The studs 1, 6, otherwise are not accessible to be supported for applying and tightening the spring nut devices thereon and accordingly, such operation is best performed entirely from the rearward side of the supporting part by a tool such as that of the present invention, as hereinafter more fully set forth.

Fig. 2 illustrates another assembly of parts in which the fastener and tool of the present invention are particularly well suited for completing the installation in a most effective and highly practical manner. A supporting panel C, is provided with connecting means in the form of barbed studs 6, for example, extending therethrough and otherwise driven into a layer or pad of fibrous material D, fibre board or the like, such as used on the dash of a motor vehicle or the walls of a refrigerator for insulation purposes. A cover piece E such as a finishing panel, fabric or other material is disposed on the opposite side of supporting panel C concealing the heads 7 of the studs. The said heads 7 are thus difficult to locate easily and quickly in order that the studs may be supported during the tensioning of the spring nut devices applied over the projecting free ends thereof; it is therefore most expedient to apply and tighten the spring nut devices by an operation taking place entirely from the rearward side of the assembly at the outer face of the layer or pad D, and this is readily accomplished by the herein disclosed tool device, as presently to be described.

While the connecting means may be provided in various forms in the manner of integrally molded plain studs, rivets, common nails and the like, in the assembly of Figs. 2 and 4, the studs 6 are preferably of the type having a serrated or ring-barbed shank which serves a dual function, first, of providing sufficient holding ability in the fibre board, insulating material or the like D, for temporarily installing the same in proper relation on supporting panel C, whereas an ordinary nail having only a smooth or roughened shank would not be held with sufficient gripping force for this purpose by the relatively soft and porous composition of such materials; and second, such a barbed shank defines a pronounced shoulder or rib construction with which a cooperating spring nut device applied thereto from the rearward side of the assembly is capable of a positive locking action in fastening the parts of the assembly in permanently secured relation.

A ring-barbed stud 6 otherwise is such as to define a series of sharp abutments or shoulders 8 spaced by grooves receiving the adjacent surrounding material of the pad or fibre board D, on being driven therein, to interlock with the shank and engage particularly said shoulders 8 thereof and thereby resist withdrawal of the stud after being thus initially applied. Accordingly, even though the relatively soft and porous material D lacks sufficient body to retain ordinary nails, the use of studs having the ring-barbed shanks in accordance with the present invention, provides for sufficient holding power to retain the same effectively in temporarily installed relation on the supporting panel C; and thus, in a speedy and economical method of procedure, the temporary installation of large sections of fibrous material D may be carried out to completion over an entire wall surface, if desired, prior to the application of the cooperating spring nut devices 10 over the projecting free ends of the studs for permanently securing the installation.

Said spring nut devices 10 are essentially sheet metal locking plates or clips which are constructed from relatively thin sections of any suitable sheet metal, preferably spring metal such as spring steel or cold rolled steel having spring-like characteristics. A spring nut device may be provided from blanks of various outlines but, as shown in Fig. 3, is most economically constructed from a simple generally rectangular section which may be provided at very low cost from ordinary strip stock with little or no loss or waste of material. The blank is bent into the form of a pronounced, generally U-shaped hump or arched body 11 between end sections 12 which are of sufficient length to define substantial bearing surfaces or spring clamping elements capable of frictional sliding relation to the adjacent surface secured thereby upon tensioning of the nut device in finally applied fastening position. To this end, the junctions of the usually flat end sections 12 with the respective arms of the U-shaped hump 11 are preferably slightly curved as at 14, Fig. 3, to define rounded bearing surfaces which expedite such sliding relation by substantial cam action in the most effective manner.

At the substantial center of the apex of said arch or hump 11, a stud opening is provided together with spaced parallel slits on either side of said opening defining cooperating yieldable substantial tongues 15, or the like, between integral side strip sections 16, Fig. 3, laterally adjacent thereto and defining the crown of said yieldable hump 11 or apex of the generally arched body of the fastener. The extremities of said tongues 15 are at least equal to or slightly greater in width than the root diameter of the stud member and are preferably V-notched and oppositely disposed to define substantial jaws adapted to cut into embedded relation with the stud shank in substantially equal biting engagement therewith in applied fastening position.

Said tongues 15 otherwise are relatively short and bent into substantially ogee formation to extend slightly outwardly out of the bent contour of the generally U-shaped hump or arched portion 11 at the crown or apex thereof. The tongues thus provided are possessed of unusual inherent strength and sufficient resiliency to yield as necessary for the extremities thereof to admit therebetween the plain shank of a nail, rivet or integrally molded plastic connecting stud, or the irregular shank of a barbed stud and snap over the respective ribs 8 of such stud upon application of the spring nut to temporary fastening engagement therewith, substantially as shown in Fig. 2. In any position of application, the extremities of said tongues 15 are adapted to engage the rib 8 immediately adjacent thereto or positively grip the shank of a plain stud, Fig. 1, and thereby lock the spring nut against movement in a reverse direction toward removal from initially applied position.

The arrangement otherwise is such that the pronounced hump or arched body 11 of the spring nut provides a highly resilient spring locking plate device which is considerably more flexible than any usual spring nut. The tongues 15 are yieldable with respect to said hump or arched body and relative to each other in such a way that the extremities thereof are readily adapted for sliding along the smooth shank of a plain stud or for snapping over the ribs 8 of a barbed stud in one direction in the manner of yieldable pawls sliding over a ratchet to provide what may be termed, a one-way clutch gripping action with the stud. The spring nut devices, accordingly, may be speedily installed in initially applied fastening position on the studs by a substantial axial, thrust-like force in a minimum of time and effort, and the generally arched body or hump 11 thereof then depressed toward flat as necessary to tightly secure the same against the adjacent work under a tensioned spring locking action, as hereinafter more fully set forth.

In the initially applied position of a spring nut 10 as shown in the upper portion of Fig. 1, and as in Fig. 2, the hump or generally arched portion 11 projects materially away from the adjacent surface of the work, and the pronounced generally concavo-convex configuration thereof provides for a relatively great amount of flexion as said hump is depressed to tensioned condition in the finally applied fastening position of the spring nut. This facilitates the final setting of the fasteners and otherwise permits the end sections 12 and rounded bearing surfaces 14, Fig. 3, of a spring nut to slide easily on the adjacent surface of the work by substantial cam action without mutilating or otherwise damaging the same in any way which would preclude an effective and reliable installation.

When a spring nut device 10 is tensioned by being depressed from the position of the upper showing of Fig. 1, and as in Fig. 2, substantially to that of the lower showing of Fig. 1 and of Fig. 4, pressure is exerted, more particularly, on the apex of the arch or crown of the hump 11 to urge the same toward a flattened condition against the adjacent work surface. The body of the spring nut is thus elongated and the end sections 12 caused to slide generally outwardly and upwardly as the extremities of the tongues 15 snap over successive ribs 8 of the barbed shank until engaged with a rib adjacent the rearward work surface. When pressure is removed, the tongue extremities are disposed in locked abutting engagement with the sharp, pronounced shoulder defined by such rib as the body of the device attempts to assume its initially, normally untensioned, generally arched or humped configuration. This naturally tends to draw the stud shank axially to take up automatically any clearance in the assembled parts and tightly and rigidly secure said parts, in addition to providing a constant spring locking action of the spring nut with the barbed shank or plain stud, as the case may be.

Under such spring locking action, the notched extremities of the tongues 15 are urged inwardly toward each other to biting engagement with the root diameter of the stud shank as the adjacent free end portions thereof are disposed in positive locked abutting engagement with the sharp abutment or shoulder 8 of the engaged rib or ring barb. In this way the spring nut devices or locking plates 10 serve to exert a continuously effective spring drawing action generally axially of the shanks of the studs, thereby initially drawing the parts into close, snug and fixed engagement, and thereafter providing a firm, rigid and locked assembly of the parts of the installation without possibility of becoming loose or removed even under extreme conditions of jarring, vibration and strain.

It has been found that this most effective locking and axial drawing action of a spring nut device 10 to provide a tight, rigid installation is best obtained when the generally arched body or hump 11 is depressed without any substantial pressure being exerted directly on the tongue elements 15 themselves; any substantial pressure on the tongues prevents a spring nut from having easy sliding movement axially of a plain stud or over the ribs of a barbed shank on being applied, and often bends the tongues such that the extremities thereof are deformed out of position for most effective contact with the stud shank and perhaps have a tendency to slip and permit the spring nut to loosen from tensioned, finally applied position in a tightened installation.

The tensioning of the spring nut devices may be performed in any suitable way for depressing the same, as aforesaid, but preferably by the use of a special tool comprising a pressure head designed to engage the hump portions 11 adjacent the bases of the tongues 15 or at the apex side sections 16 without exerting pressure directly on said tongues 15. Thus, pressure may be applied to the hump or arched body 11 of the spring nut to depress and tension the same without likelihood of deforming the tongues; and accordingly, when the tool is withdrawn and the attendant pressure removed from the depressed body of the spring nut, the tension stored therein causes the tongues to become locked with the stud and produces the axial drawing action on the shank for providing a rigid and tightened installation, as aforesaid. In this respect, it will be understood that the bending moment which serves to lock the spring nut on the ring barbed stud in finally applied position, is produced by the downward pressure of the abutment or shoulder 8 of the finally engaged rib barb on the extremities of the tongues 15, and the upward reaction pressure applied to said tongues by the depressed and tensioned body or hump 11 of the spring nut in attempting to assume its initial configuration.

Fig. 5 shows a tool of this character which is designed for tensioning the spring nut devices by an operation taking place entirely from the rearward side of the work, as is required in installations, such as previously described, in which it is impractical or inconvenient to support the heads of the connecting studs during the depressing action for tensioning the spring nuts applied over the projecting free ends of said connecting studs. The tool is preferably provided in the general construction of a pistol-type device for use in the manner of a push-pull implement which may be easily and quickly manipulated in one hand of an operator with his other hand free to make ready the next spring nut to be applied and tensioned. A simple and cheap construction of this character may comprise a barrel or body member 20 having a large bore 21 merging into a small bore 22 to define an interior shoulder or abutment 23. At the free end of said small bore 22 a generally conical recess 24 is provided defining a peripheral tool head 25 at the forward end of the tool body.

In the large bore 21, a plunger 26 or the like is slidably received and a longitudinal slot 27 provided in the barrel adjacent said plunger. Said slot 27 is of length approximating the greatest necessary amount of rearward travel of the plunger as actuated by a trigger element 28 secured to said plunger in any suitable way, as by a set screw 29 threaded into said plunger 26 and extending through said slot 27 for attachment of the trigger element thereto.

In the small bore 22, there are slidably received a pair of cooperating spring fingers 30 attached to the forward end of plunger 26 as by a screw 32, Figs. 5 and 6. Said fingers may be provided as separate elements or in the manner of a one-piece generally U-shaped strip defining said fingers together with a connecting portion having an aperture receiving said screw 32 for securing the fingers in swivel attached relation to the plunger 26. As best seen in Fig. 6, said fingers are formed in the manner of transverse corrugations snugly received in said small bore 22 and of such length as to project beyond the forward end of the barrel defined by the peripheral tool head 25 in normal position. The projecting portions of said fingers are bent outwardly from adjacent said bore 21 to define inclined cam surfaces 34 tapering generally outwardly from each other and provided with inturned end portions defining gripping jaws 35 in offset relation to each other so as to overlap in the compressed relation of said fingers. As shown in Fig. 7, said gripping jaws 35 are suitably notched or recessed to define substantial claws 36 having a tapered space or bight therebetween gradually diminishing to a size considerably smaller than the root diameter of the stud shank, and thereby being adapted to be applied easily and quickly to grip a plain stud by an effective biting action, and/or adjacent a rib 8 on a barbed stud without likelihood of slippage during the final tensioning of a spring nut thereon.

A coil spring 37 is retained in the large bore 21 by a closure cap 38, and said spring bears upon the plunger 26 to urge the same to the end of its forward movement as limited by the abutment 23, in which relation the cam surface portions 34 of the fingers and the jaws 36 carried thereby project normally beyond the end of the tool head 21 for application and use of the tool, as presently to be described. A suitable handle is provided for the tool such as a pistol grip 40 connected to the barrel 20 in any suitable way, as by spaced clamping head sections 41 recessed to receive said barrel 20 and urged to fixed, clamping engagement therewith by a stud bolt 42, substantially as illustrated in Fig. 6.

From the foregoing, it will be readily understood that the tool may be employed to tension a spring nut initially applied over the end of a plain stud represented in the upper portion of Fig. 1, or a serrated or barbed stud substantially as shown in Fig. 2. In any event, the action is such that the claws 36 of the gripping jaws 35 bite into and rigidly grip the stud shank while the cooperating tool head 25 moves with respect thereto to depress the hump or arched body 11 of the spring nut against the adjacent face of the work, substantially as shown in Fig. 4. Said peripheral tool head 25 is so designed as to engage, in any position of application, the hump portion 11 of a spring nut adjacent the bases of the projecting tongues 15 such that no pressure is exerted thereon which would tend to mutilate or distort said tongues out of their essential ogee formation designed for most effective fastening engagement with the connecting stud. Said tongues 15 are receivable in the recess 24 of the tool head and thereby capable of yielding and flexing as necessary upon actuation of the tool head 25 to such position of most effective fastening engagement with the connecting stud.

Accordingly, upon initial application of the tool head as illustrated in Fig. 2, the plain or barbed connecting stud is received between the jaws 35 at the ends of gripping fingers 30. Upon manipulation of the actuating member or trigger 28, to move the same toward the handle 40, the plunger 26 is moved rearwardly in the barrel 20 compressing the coil spring 37 and drawing the projecting portions of fingers 30 inwardly into the small bore 22 adjacent the tool head recess 24. During this inward drawing action on the fingers 30, the inclined cam surfaces 34 on the projecting portions thereof are gradually compressed toward each other by the leading end of said bore 22 to cause the jaws 35 to move inwardly into gripping engagement with the connecting stud as illustrated in Fig. 4 in positive abutting relation with the engaged ring barb 8, or, in fixed, biting engagement with a plain stud, as the case may be.

Such movement of the fingers 30 inwardly in the bore 22, causes the tool head 25 to move relative thereto into engagement with the hump or arched body portion 11 of the spring nut adjacent the bases of the tongues 15, and upon further movement of the tool head in this manner, said hump of the spring nut is depressed thereby from the position of Fig. 2 to tightened, tensioned fastening position substantially as shown in Fig. 4. When the actuating element or trigger 28 of the tool is released, the compressed coil spring 37 is free to expand and accordingly, urges the plunger 26 forwardly to its initial, normal position shown in Fig. 5. The projecting cam portions 34 of fingers 30 thus clear the bore 22 and permit said fingers to spring outwardly sufficiently for the jaws 35 carried thereby to disengage from the stud, whereupon the tool may be easily and quickly withdrawn.

When the tool is withdrawn and the attendant pressure removed from the depressed body of the spring nut, the device naturally tends to assume its initial arched or humped configuration and, in so doing, forces the extremities of tongues 15 inwardly into locked abutting engagement with engaged shoulder or ring barb 8 and otherwise causes the notched extremities of said tongues to cut into and become embedded in the root diameter of the stud shank in permanently locked relation therewith, as aforesaid. At the same time, an axial drawing action is exerted by the spring nut on the stud shank to pull the same generally axially to tighten automatically the parts of the assembly and otherwise ensure a strong, reliable and positively secured installation at all times. Similarly, in the case of a plain or smooth shank provided by a rivet, nail, or integrally molded stud on a plastic part, the tool head 25 depresses the hump or arched body portion 11 of the fastener against the adjacent work surface to finally applied, tensioned fastening position, at which point the sharp edges of the tongues 15 clutch the plain stud and prevent reverse movement of the spring nut in the direction toward removal therefrom. When the tool is withdrawn, the spring nut attempts to assume its initial condition urging the extremities of said tongues inwardly toward each other into embedded, positive locked, biting engagement with the connecting stud, and otherwise exerting an axial pull on the stud to draw the parts of the assembly automatically into tight, rigid and permanently secured relation, as aforesaid.

While the invention has been described in detail with a specific example, such example is intended as an illustration only, since it will be apparent to those skilled in the art that other modifications in the construction, arrangement and general combination of parts thereof may be devised without departing from the spirit and scope of the invention. The present embodiment is therefore to be considered in all respects as illlustrative and not restrictive, the scope of the invention being indicated by the appended claims rather than by the foregoing description, with all changes falling within the scope, meaning and range of equivalency of the claims intended to be embraced therein.

What is claimed is:

1. A tool for applying a sheet metal spring fastener to tightened, tensioned and fastening position on a cooperating bolt or stud associated with work to be secured, the fastener having a resilient body and bolt or stud securing means, said tool comprising a body having an axial bore including a larger bore merging into a smaller bore and defining an abutment therebetween, said smaller bore extending to a recess at the forward end of said body defining a toolhead for engaging the fastener to tighten the same in fastening position on the bolt or stud, a handle secured to said body, a plunger slidable in said larger bore, and a trigger or the like carried by the plunger in proximity to said handle for actuating said plunger, spring means urging said plunger forwardly with said abutment limiting the forward movement of the plunger to its normal position, spring fingers attached to said plunger extending through the smaller bore and projecting beyond said toolhead in such normal position of the plunger, bolt or stud gripping elements having outwardly tapering cam surfaces provided on the projecting portions of said spring fingers, said spring fingers having inward movement relative to the toolhead upon actuation of the plunger, and said cam surfaces on the gripping elements engaging the walls of said smaller bore to compress said gripping elements during such inward movement of the spring fingers for gripping the bolt or stud as the fastener thereon is engaged and tightened by the toolhead.

2. A tool for seating a spring metal fastener about a stud projecting through it comprising a tubular barrel having a bore adapted to surround the stud and an annular end surface adapted to engage the fastener, a handle rigid on the tubular member and projecting laterally therefrom, whereby the tubular member may be pushed forcibly against the fastener, a pair of opposed jaws in the barrel and having inwardly projecting portions to engage the stud, cam surfaces on the interior of the body adapted to coact with the jaws to force the same inwardly into engaging position as they are withdrawn into the body, a plunger in the body to which the inner ends of the jaws are secured, a spring within the barrel acting on the plunger to force the jaws to releasing position, and a handle projecting laterally from the plunger through a slot in the barrel and standing adjacent the lateral handle on the body so that both handles may be gripped by the same hand of the operator.

3. A tool for seating a spring metal fastener about a shouldered stud projecting through it, comprising a tubular barrel adapted to surround the stud and an end surface adapted to engage the fastener on opposite sides of the stud, said barrel having a reduced bore adjacent its active end, a plunger slidable in the larger bore of the barrel and guided thereby, a pair of fingers secured to the barrel extending along the reduced bore and terminating in outwardly flaring portions having inwardly projecting end flanges to coact with the stud, a plug closing the opposite end of the barrel, a compression spring between the plug and plunger tending to maintain the plunger in jaw-releasing position, a handle rigidly secured to the plunger projecting laterally therefrom through a slot in the barrel, and another handle rigidly mounted on the barrel and projecting laterally therefrom in approximate parallelism with the plunger handle, whereby both handles may be grasped by the same hand of the operator to force the barrel against the fastener and pull the jaws into the barrel to anchor them to the stud.

GEORGE A. TINNERMAN.